(12) United States Patent
Vlodavsky et al.

(10) Patent No.: US 7,644,188 B2
(45) Date of Patent: Jan. 5, 2010

(54) DISTRIBUTING TASKS IN DATA COMMUNICATIONS

(75) Inventors: Zvi Vlodavsky, Mevaseret-Zion (IL); Fabian Trumper, Jerusalem (IL); Avigdor Eldar, Jerusalem (IL); Ariel Rosenblatt, Montreal (CA); Moshe Valenci, Givat-Zeev (IL)

(73) Assignee: Intel Corporation, Santa Clara, CA (US)

( * ) Notice: Subject to any disclaimer, the term of this patent is extended or adjusted under 35 U.S.C. 154(b) by 1982 days.

(21) Appl. No.: 10/179,779

(22) Filed: Feb. 25, 2002

(65) Prior Publication Data

US 2003/0161327 A1    Aug. 28, 2003

(51) Int. Cl.
    *G06F 15/16* (2006.01)
(52) U.S. Cl. ..................................... 709/250
(58) Field of Classification Search ................. 709/235, 709/250; 370/229, 237, 463
    See application file for complete search history.

(56) References Cited

U.S. PATENT DOCUMENTS

| | | | | |
|---|---|---|---|---|
| 5,918,021 A * | 6/1999 | Aditya | ........................ | 709/235 |
| 5,937,169 A | 8/1999 | Connery et al. | | |
| 6,141,705 A * | 10/2000 | Anand et al. | .................. | 710/15 |
| 6,356,951 B1 * | 3/2002 | Gentry, Jr. | ................... | 709/250 |
| 6,370,599 B1 * | 4/2002 | Anand et al. | ................... | 710/15 |
| 6,389,468 B1 * | 5/2002 | Muller et al. | ................ | 709/226 |
| 6,590,861 B1 * | 7/2003 | Vepa et al. | ................... | 370/216 |
| 6,718,393 B1 * | 4/2004 | Aditya | ........................ | 709/239 |
| 6,724,721 B1 * | 4/2004 | Cheriton | ..................... | 370/229 |
| 6,857,030 B2 * | 2/2005 | Webber | ........................ | 710/33 |
| 6,904,519 B2 * | 6/2005 | Anand et al. | ................ | 713/100 |
| 6,928,482 B1 * | 8/2005 | Ben Nun et al. | ............ | 709/235 |
| 6,981,074 B2 * | 12/2005 | Oner et al. | ..................... | 710/32 |
| 2002/0012433 A1 * | 1/2002 | Haverinen et al. | .......... | 380/247 |
| 2002/0107804 A1 * | 8/2002 | Kravitz | ........................ | 705/51 |
| 2002/0147909 A1 * | 10/2002 | Mullen et al. | ................ | 713/173 |

* cited by examiner

*Primary Examiner*—Jeffrey Pwu
*Assistant Examiner*—Alicia Baturay
(74) *Attorney, Agent, or Firm*—Trop, Pruner & Hu, P.C.

(57) ABSTRACT

A capability of a device may be registered to an adapter. This capability may characterize the device in terms of tasks performing abilities that may be available or associated therewith. When a packet of data including a task to be handled is received at the adapter, based on the capability registered earlier for the device, the adapter may determine whether to assign the task to the device. An indication, such as packet processing information may be derived from the packet to assist in distribution of the task. By comparing the indication with the capability, the task may be offloaded to the device based on the comparison. Using the device for a networked device, in one embodiment, one or more network communication tasks associated with data communications may be distributed and optionally performed within an adapter. In this way, the networked device may be spared of undertaking network communication tasks that are conventionally performed within the networked device.

8 Claims, 7 Drawing Sheets

DISTRIBUTING TASKS IN DATA COMMUNICATIONS

BACKGROUND

This invention relates generally to data communications, and more particularly to distributing tasks associated with data communications in networked systems or devices.

Several protocols are available for data communications between networked systems or devices on a variety of network architectures. Ethernet is a common protocol for a packet-based network, such as local area networks (LANs). Like other packet-based network protocols, the Ethernet enables communication of data in packets (e.g., a data packet, such as an Ethernet packet) over a network. These packets include a source and a destination address, the data being transmitted, and a series of data integrity and security bits. For example, a typical Ethernet packet used for transferring data across a network generally includes a preamble which may include a start frame indication, a destination address to identify the receiving node for the Ethernet packet, a source address to identify the transmitting node directly on the transmitted packet, and a set of fields to indicate packet characteristics, such as the packet type and packet routing information.

In some network architectures a host, such as a computer system communicates over a network using an interface and a network protocol. Over the network, communicated data may be received at the interface, such as an adapter associated with the host. For example, the adapter may include an Ethernet adapter to enable transfer of Ethernet packets from one Ethernet device to another Ethernet device coupled to the network. Commonly, a primary processor, such as a central processing unit (CPU) provided in a computer system is responsible for handling the communicated data, such as packet processing data received within or for a packet over the network.

Typically, such packet processing data may include one or more tasks associated with the packet. For the most part, many conventional network protocols perform these tasks in networking software located at a networked system, consuming computing resources thereof. For example, a packet including special purpose communication data may be received at a network adapter coupled to the networked system. Using a typical network communication software and a primary processor both located on the networked system, the packet may be examined to determine appropriate actions on the received data. This operation, however, commonly involves execution of the network communication software from the primary processor. As an example, some networking, and data communications related operations may unnecessarily tie up the primary processor, burdening the networked system with communication related operations as opposed to have it available for computing related operations.

Thus, there is a continuing need for better ways to process data communications, especially while distributing network communication tasks.

DETAILED DESCRIPTION

Figure 1:
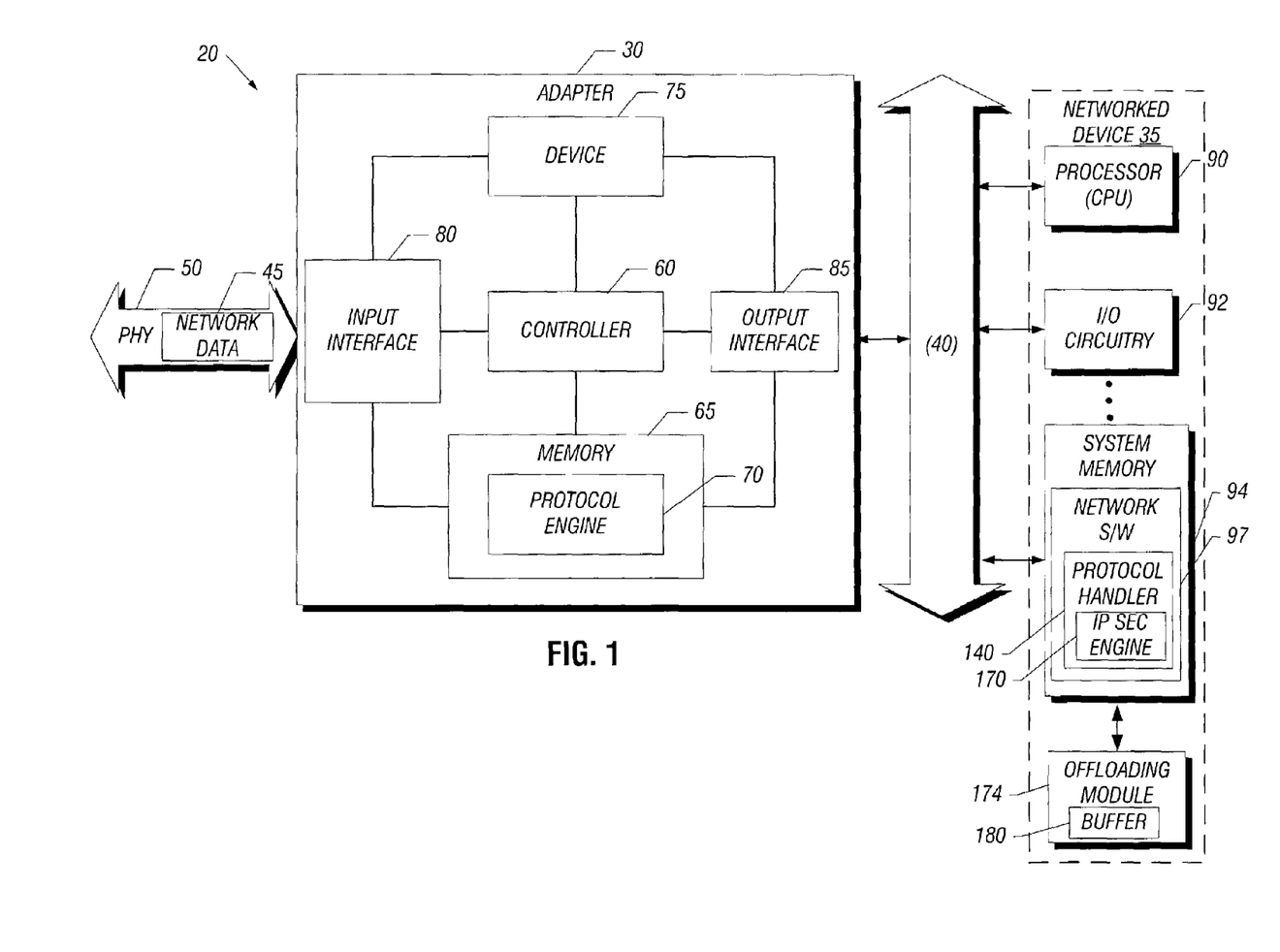
FIG. 1 is a schematic depiction of a network data processing system including an adapter consistent with one embodiment of the present invention.

A network data processing system 20, as shown in FIG. 1, includes an adapter 30 coupled to a networked device 35 (e.g., a personal computer or server) via an interface 40 (e.g., a bus) for receiving and/or sending network data 45. Through a communication medium 50, such as a physical layer (PHY) (e.g., a network wire or coaxial cable) packets of data may be communicated over a network capable of processing the network data 45. The adapter 30 includes a controller 60 and a memory 65 storing a protocol engine 70 to process the network data 45 in one embodiment. In addition, the adapter 30 may include a device 75 operably coupled to an input interface 80 and an output interface 85 to controllably process and transfer the network data 45, using a network protocol stack including a plurality of layers. As an example, the network protocol stack may be a Transmission Control Protocol/Internet Protocol (TCP/IP).

Essentially, a capability of the device 75 may be registered to the adapter 30. Consistent with one embodiment, this capability may characterize the device 75 in terms of task performing abilities that may be available or associated with the device 75. When a packet of data including a task to be handled is received at the adapter 30, based on the capability registered earlier for the device 75, the adapter 30 may determine whether to assign the task to the device 75. An indication, such as packet processing information, may be derived from the packet to assist in distribution of the task. By comparing the indication with the capability, the task may be offloaded to the device 75 based on the comparison.

Using the device 75, in one embodiment, one or more network communication tasks may be performed for the network data 45 (e.g. packets of data) within the adapter 30. While manipulating packets of data which are provided by the networked device 35 for transmission, network communication tasks, such as one or more protocol security tasks (e.g., cryptographic operations) may be first distributed for execution by either a selected hardware device especially at a particular device, such as the device 75, or by software available at the adapter 30. Accordingly, the device 75 may enable the networked device 35 to selectively offload a task at the adapter 30. In this way, the networked device 35 may be spared of undertaking network communication tasks that are conventionally performed within the networked device 35.

In accordance with one embodiment of the present invention, the adapter 30 may be a network controller or adapter that enables communication of packets, such as Ethernet or Internet protocol (IP) packets for the networked device 35 over a network. In some embodiments, the input interface 80 may be a medium access controller (MAC) being responsible for controlling the flow of data to and from the network. Likewise, the output interface 85 may comprise a buffering interface having a capability to receive packets of data from the interface 40 which may be a bus (e.g. serial or parallel) in some embodiments. The protocol engine 70 may enable a network protocol stack to exchange packets, or frames of information over the network.

According to one embodiment of the present invention, the networked device 35 may include a processor, such as a central processing unit (CPU) 90, input-output (I/O) circuitry 92 and a system memory 94 storing a network software 97. Examples of the networked device 35 include a processor-based system, such as a desktop computer, a laptop computer, a server, or any one of a variety of other computers or processor-based devices. Examples of the interface 40 include a peripheral component interconnect (PCI) bus. The specification for the PCI bus is set forth in a specification entitled "PCI Local Bus Specification, Revision 2-2, 1998."

In operation, the CPU 90 composes packets of data, generates headers and checksums, and transfers the prepared packets down the interface 40 to the I/O circuitry 92 using any one of available protocols consistent with one or more desired industry standards. The I/O circuitry 92 sends these packets of data to the adapter 30 via the interface 40. At the adapter 30, the output interface 85 may receive the packets of data for further processing and subsequent transfer onto the network. For the purposes of cooperating with the adapter 30 while communicating the packets of data over the interface 40, the network software 97 may be operated to perform functions and operations consistent with a network protocol stack, serving applications that control network traffic. Other programs may also be stored in the system memory 94 to assist a particular network data processing system.

In one embodiment, the network software 97 may be associated with the transport and network layers. When executed by the CPU 90, the network software 97 parses the information that is indicated by the protocol header to facilitate additional processing of the packet at the adapter 30. Using the protocol engine 70, the adapter 30 and the networked device 35 may implement protocol stacks, such as TCP/IP stacks and perform protocol tasks including protocol security tasks associated with the packets of data at the device 75 rather than the network software 97 provided within the networked device 35.

The adapter 30 may be located at a client or a node on the network to operate with the networked device 35. Of course, in some embodiments both the adapter 30 and the networked device 35 may be integrated in one unit. In one case, the TCP/IP stack may be divided across the adapter 30 and the networked device 35 into five hierarchical layers: an application layer, a transport layer, a network layer, a data link layer and a physical layer. For example, in some embodiments, an open systems interconnection (OSI) layered model developed by the International Organization for Standards (ISO) as set forth in a specification entitled "Information technology—Telecommunications and information exchange between system—Use of OSI applications over the Internet Transmission Control Protocol (TCP) ISO/IEC 14766:1997" may be used. This specification generally describes exchange of information between layers and is particularly useful for separating the functions of each layer, and thereby facilitating the modification or update of a given layer without detrimentally impacting on the functions for neighboring layers. At the lowest layer, the OSI model includes the physical layer that is responsible for encoding and decoding data into signals that are transmitted across the communication medium 50.

Examples of the adapter 30 include an Ethernet device that may enable communication of Ethernet packets. Regardless of the data rates, the adapter 30 may process Ethernet packets for the entire class of carrier sense multiple access with collision detection (CSMA/CD) protocols, such as indicated in a family of known computer industry standards. For example, including but is not limited to, 1-megabit Ethernet, 10-megabit Ethernet, 100-megabit Ethernet, 1000-megabit or 1-gigabit Ethernet or any other network protocols at any other data rates that may be useful in packet-based networks.

In order for the adapter 30 (FIG. 1) to know which network communication tasks, such as security tasks (e.g., cryptographic operations) it should perform, or for the network software 97 to know which tasks were performed by the device 75, per-packet information may be stored in a way such that its retrieval may be possible across multiple layers of a networking stack. This may be advantageously achieved using a packet built-in mechanism for the adapter 30. Such a mechanism is described herein for processing data communications to distribute security related network communication tasks according to one embodiment of the present invention but embodiments of the present invention could be used for a variety of other tasks.

According to one embodiment of the present invention, the network software 97 may comprise a protocol handler 140 including an Internet Protocol Security (IPSec) engine 170. In addition, an offloading module 174 may be located at the networked device 35, communicating with the network software 97 and the adapter 30. The offloading module 174 may include a buffer 180. Additionally, while the protocol data units (PDUs) may be stored in the system memory 94, the protocol headers, such as Ethernet headers, for the Transmission Control Protocol/Internet Protocol (TCP/IP) may be formed based on the protocol handler 140.

For a typical Ethernet packet, in one embodiment, the protocol handler 140 may include an IP header that indicates such information as the source and destination IP addresses for the packet. The Ethernet packet may include a security header that indicates a security protocol (e.g., an Internet Protocol Security (IPSec) protocol) and attributes of the packet. Also, the Ethernet packet may include a transport protocol header (a TCP protocol header, as an example) that is specific to the transport protocol being used. As an example, a TCP protocol header might indicate a TCP destination port and a TCP source port that uniquely identify the applications that cause the adapter 30 associated with the networked device 35 to transmit and receive the packets. The Ethernet packet may also include a data portion, the contents of which are furnished by the source application, and a trailer that is used for encryption purposes.

As an example, a TCP protocol header may include a field that indicates the TCP destination port address. Another field of the TCP protocol header may indicate a sequence number that is used to concatenate received packets of an associated flow. Packets that have the same IP addresses, transport layer port addresses and security attributes are part of the same flow, and a sequence number indicates the order of a particular packet in that flow.

Figure 2:
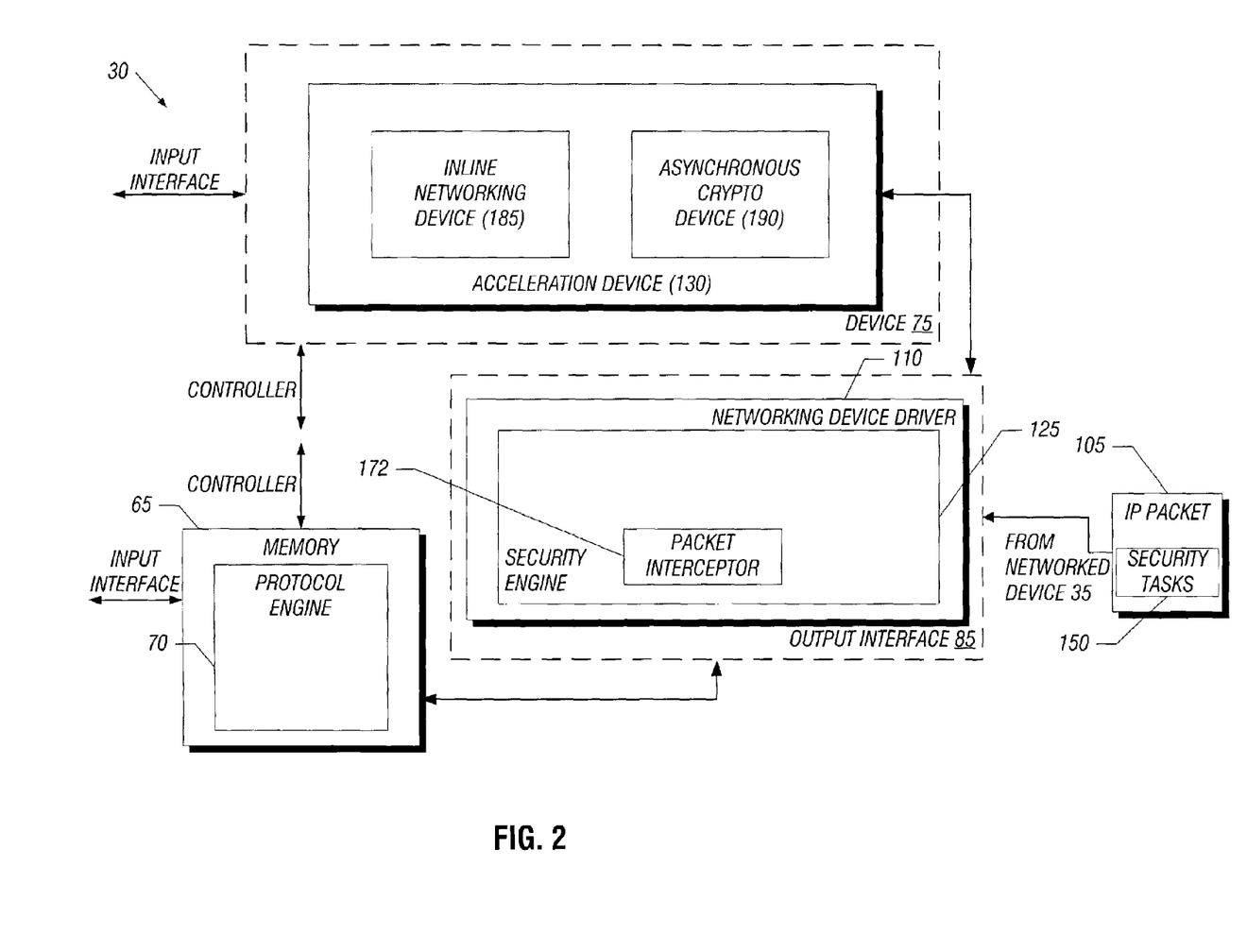
FIG. 2 is a schematic depiction of the adapter of FIG. 1 for processing packets of data according to one embodiment of the present invention.

In one embodiment, the adapter 30 as shown in FIG. 2 may receive a packet such as an Internet Protocol (IP) packet 105 from the networked device 35 at the output interface 85. By deploying any one of a variety of available architectures, the adapter 30 may be configured to cooperatively process the IP packet 105 with the networked device 35.

To process the IP packet 105, the output interface 85 may comprise a device driver 110 including a security engine 125. The device driver 110 may control an acceleration device 130 located at the device 75, which may perform one or more tasks, such as protocol security tasks associated with the IP packet 105. At some point, a set of protocol security tasks 150 may be defined for the IP packet 105 based on a particular networking stack deployed. Under the control of the controller 60 of FIG. 1, the protocol engine 70 may first parse the IP packet 105 to ascertain whether to have it selectively processed by the acceleration device 130 in one embodiment. Once the IP packet 105 is processed by to the security engine 125, it may be transferred to the network via the input interface 80 shown in FIG. 1.

In one embodiment, a technique generally known as an out-of-band (OOB) mechanism may be used for communicating per-packet information between different layers or components of a network protocol stack. Such per-packet information may be included with other data that resides in the IP packet 105. For example, in a transmitted packet, the TCP/IP layer may store some information for the packet including instructions indicating to the device driver 110 about special processing, if required. When the IP packet 105 reaches the device driver 110, appropriate packet processing information regarding the packet 105 may be obtained and the instructions may be derived therefrom. Although the out-of-band mechanism is discussed here in the context of Internet Protocol security (IPSec) packets, processing of other packets of data may be performed in a similar fashion.

Instead of the network software 97 (FIG. 1), when a device is selected among one or more hardware devices, such as the acceleration device 130 to perform per-packet operations, one or more per-packet tasks associated with protocol layers, (e.g. cryptographic operations associated with IPSec packets) may be offloaded in some embodiments. While transmitting the IP packet 105, a security layer, such as the IPSec layer may record the tasks to be offloaded to the adapter 30 as a packet data. The acceleration device 130, which may perform the allocated task, may later check this data. Upon receiving the IP packet 105, for example, the acceleration device 130 may record the tasks to be performed in the out-of-band data. To avoid repeating these tasks in the network software 97, the IPSec engine 170 may again later check which tasks the network software 97 should do by querying the offloading module 174, which in turn checks the out-of-band data for this purpose.

In some embodiments of the present invention, at least two types of devices may be used for offloading tasks. Namely, inline devices that perform the tasks during a networking flow of packet's transmission or reception and asynchronous devices, i.e., crypto devices that process the packet after being taken out of the networking flow. For offloading tasks, both of these types of devices may use the out-of-band mechanism in order to communicate the information about the offloading. Of course, this out-of-band mechanism may also be used for any other purposes, which require passing information about IPSec packets, between different layers of the network protocol stack by advantageously using certain attributes of IPSec packets.

Processing of a typical packet of data used for transferring desired content across a network, such as the IP packet 105 received at the output interface 85, is shown in FIG. 2 according to one embodiment of the present invention. When the device driver 110 receives the IP packet 105 for transfer to the network, as described earlier, the device driver 110 uses the security engine 125 to derive one or more tasks associated with the IP packet 105. To this end, the security engine 125 may include a packet interceptor 172 to interact with the network software 97 and the offloading module 174. The packet interceptor 172 intercepts the packets being processed by the network software 97. In the illustrated embodiment, the packet interceptor 172 is located at the adapter 30 for intercepting the IP packet 105 in order to derive one or more security tasks 150. However, in some embodiments of the present invention, the packet interceptor 172 may be advantageously located in any stage of the packet flow, i.e., between the IPSec engine 170 and the adapter 30. To temporarily store data associated with each task embedded in the IP packet 105, the offloading module 174 may use the buffer 180. This is a buffer, which is connected to a packet and used to store data specific to the packet. This data may be the out-of-band (OOB) data that is typically associated externally with a packet of data to enable intra-layer or intra-component communication.

Based on the OOB data derived from the IP packet 105, indicating corresponding tasks, the security engine 125 may determine whether to assign a particular task to the acceleration device 130 or perform the task using the network software 97 (FIG. 1) instead. In some embodiments of the present invention, the acceleration device 130 may include an inline networking device 185 and an asynchronous crypto device 190 to perform cryptographic tasks for the IP packet 105. Alternatively, in another embodiment, the inline networking device 185 and the asynchronous crypto device 190 may be two separate devices.

Figure 3:
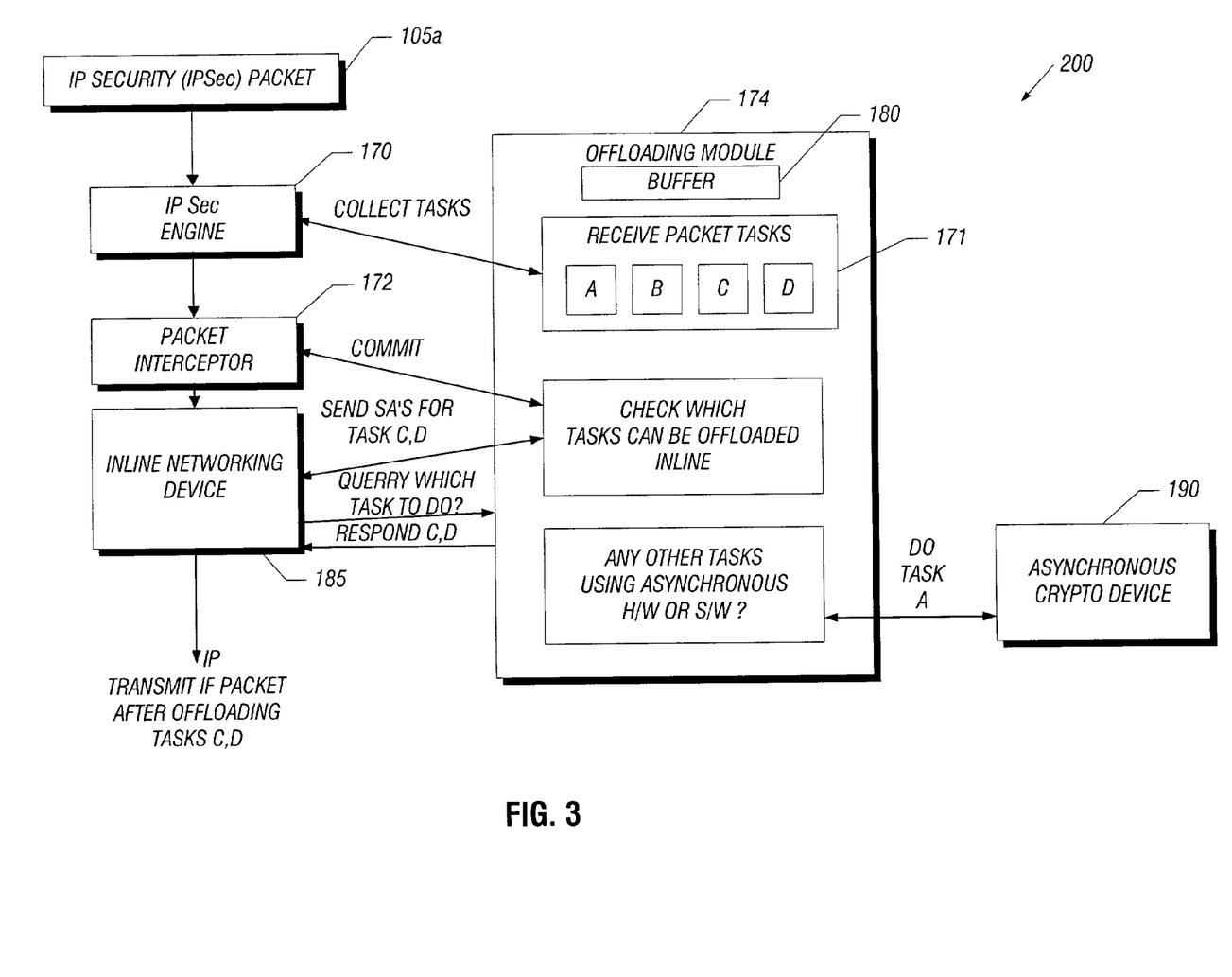
FIG. 3 shows a transmit flow incorporating offloading of network tasks according to one embodiment of the present invention.

A transmit flow 200 as shown in FIG. 3 incorporates the offloading module 174 to assist in distribution of the tasks extracted from an Internet Protocol security (IPSec) packet 105a according to one embodiment of the present invention. At some point, before processing the IPSec packet 105a, the IPSec engine 170 informs the offloading module 174 of one or more security associations (SAs) being added or deleted for the transmit flow 200. A security association (SA) may be a set of security parameters that determines which transformation is to be applied to the IPSec packet 105a and how it should be applied. For example, a SA may include a cryptographic key useful for performing the transformation.

On one end the IP Sec engine 170 interfaces with the offloading module 174, and on the other end the hardware devices, i.e., the inline networking device 185 and the asynchronous crypto device 190 may interface, to support offloading of the Internet Protocol security (IPSec) tasks 171. Upon initialization, both the devices 185 and 190 register their respective capabilities to the offloading module 174, informing of task handling abilities. Thereafter, the IPSec engine 170 requests the offloading module 174 to offload various tasks. Then the offloading module 174 compares the tasks to the capabilities of the devices 185, 190, arranging for the offloading of the tasks 171 at a particular device, if possible. Alternatively, if none of the devices 185, 190 are determined to be capable of handling any of the tasks 171, the offloading module 174 falls back to the network software 97 for execution of these tasks 171.

Next, the IPSec tasks 171 (e.g. tasks A, B, C, and D) associated with the IPSec packet 105a may be collected in the offloading module 174. When the IPSec packet 105a is processed by the IPSec engine 170, the offloading module 174 records the derived IPSec tasks 171 from the IPSec packet 105a and saves this information including a packet's out-of-band data in the buffer 180. At some point after the destination (transmitting) device (in this case the inline networking device 185) is determined, the offloading module 174 commits the IPSec packet 105a for processing in order to determine appropriate distribution of the IPSec tasks 171. Thereafter, the packet interceptor 172 intercepts the IPSec packet 105a. This process involves going over tasks 171 of the IPSec packet 105a and comparing them to the capabilities of the inline networking device 185.

As determined by the offloading module 174, if any of the tasks 171 that may be offloaded inline by the inline networking device 185, the relevant SA's are sent to the inline networking device 185. Alternatively, for other tasks of the tasks 171 that may not be offloaded inline, the offloading module 174 looks for the asynchronous crypto device 190 in order to perform these remaining tasks. If found, a particular task (e.g. task A) is sent to the asynchronous crypto device 190 together with the relevant SA. If not found, such task is performed by the network software 97, using a callback function registered by the IPSec engine 170, or by indicating to the IPSec engine 170 that it should perform the task itself (depending on the implementation of the IPSec engine 170). The results of the commit operation, (i.e., who performed or will perform each task) are recorded in the packet's out-of-band data in the buffer 180.

When the IPSec packet 105a finally reaches a transmitting device supporting inline offloading i.e., the inline networking device 185, the device 185 queries the offloading module 174, asking for certain tasks among the tasks 171 it should offload (the offloading module 174 gets this task distribution information from the IPSec packet's 105a out-of-band data at the buffer 180). In this way, using the SA's provided to the inline networking device 185, one or more tasks of the IPSec packet tasks 171 corresponding to the IPSec packet 105a may be selectively offloaded. Then the IPSec packet 105a may be further transmitted from the transmit flow 200 according to one embodiment of the present invention.

Figure 4:
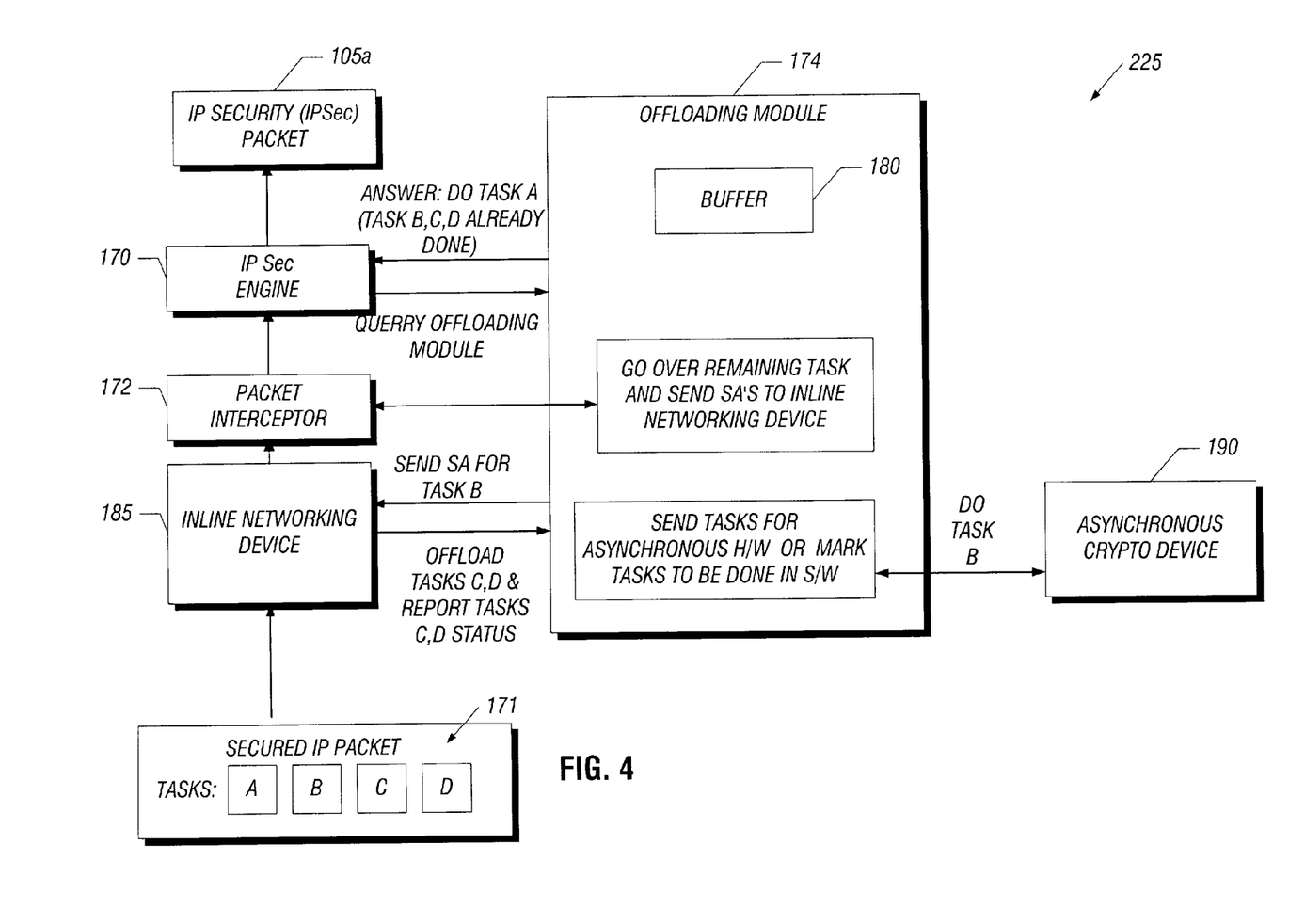
FIG. 4 shows a receive flow incorporating offloading of network tasks according to another embodiment of the present invention.

A receive flow 225, as shown in FIG. 4, incorporates the offloading module 174 for assisting in the offloading of the tasks extracted from the IPSec packet 105a according to one embodiment of the present invention. The secured IPSec packet 105a including the tasks 171 (e.g., A, B, C and D) may be received at a receiving device that supports inline offloading, i.e., the inline networking device 185. Based on the capability to support one or more tasks 171, some particular tasks, such as tasks C & D may be first offloaded by the inline networking device 185 using the SA's associated with those tasks. Then, the inline networking device 185 reports to the offloading module 174 which tasks the inline networking device 185 performed. In turn, the offloading module 174 records this in the IPSec packet's 105a out-of-band data at the buffer 180.

Using the packet interceptor 172, the offloading module 174 may intercept the IPSec packet 105a during reception. Thereafter, the offloading module 174 checks which tasks of the IPSec packet tasks 171 were not performed by the inline networking device 185. For these undone tasks, e.g., the task B, the offloading module 174 sends the relevant SA's to the inline networking device 185 so that it will be able to perform tasks similar to the task B if the device 185 capabilities allow this in the future. For the purposes of performing the task B, however, the offloading module 174 looks for the asynchronous crypto device 190 that may be able to do the task B. If such device is found, the task B is sent to that device 190 together with the relevant SA, recording that the task B was done in the packet's out-of-band data at the buffer 180.

When the IPSec packet 105a reaches the IPSec engine 170, a query to the offloading module 174 determines which particular tasks of the tasks 171 were already performed, i.e., either by inline networking device 185 or by the asynchronous crypto device 190. The offloading module 174 answers to the query according to the information in the packet's out-of-band data buffer 180. If no uncompleted task remains, the IPSec engine 170 skips the cryptographic operation for the tasks 171. Conversely, if there is an uncompleted task, the IPSec engine 170 processes the uncompleted task by cooperatively using the network software 97 (FIG. 1).

By uniquely identifying a packet related information that may be stored and later retrieved according to a unique identification of the packet, offloading of tasks 171 derived from the packet, such as the packet 105a may be provided in accordance with one embodiment of the present invention. This unique identification may be achieved by using defined attributes associated with the IPSec packet 105a in one embodiment.

Figure 5A:
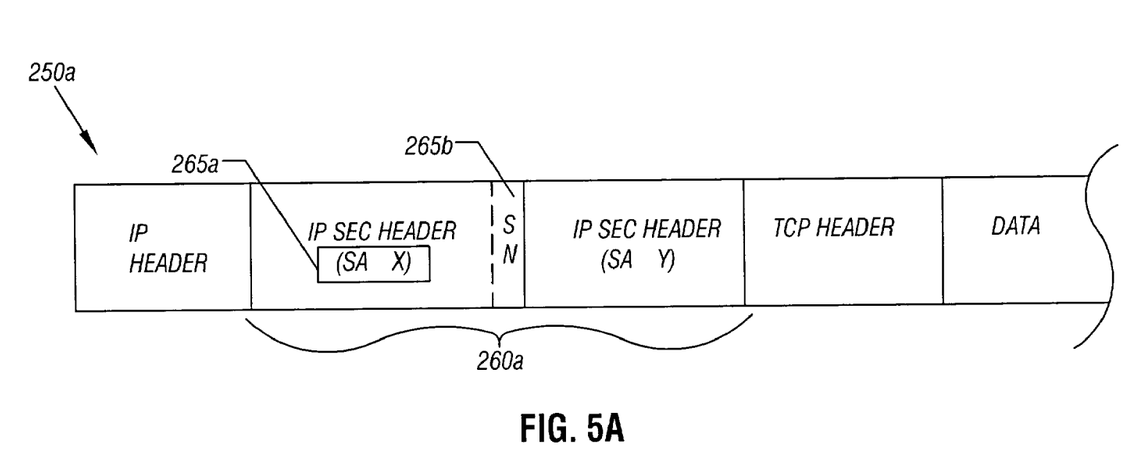
FIG. 5A shows a packet template including packet attributes useful for out-of-band processing of a packet of data by uniquely identifying the packet in accordance with one embodiment of the present invention.

A packet template 250a as shown in FIG. 5A, includes packet attributes in a field 260a for a packet such as the IPSec packet 105a of FIGS. 3 and 4. For the IPSec packet 105a, a unique identification may be achieved using one or more headers, such as IPSec headers in one embodiment. Each header may correlate to an IPSec security association (SA).

Each SA may be uniquely identified by a tuple: <security parameter index, destination IP address, IPSec protocol> in some embodiments. While the security parameter index may be provided in the IPSec header to distinguish different SAs terminating at the same destination and using the same IPSec protocol, the destination IP address may be derived from the packet's IP header and the IPSec protocol may be extracted from the header preceding the IPSec header. The tuple formed using the outermost IPSec header of the packet may indicate that the packet belongs to a particular SA in some embodiments. In order to uniquely identify a packet among all packets belonging to the particular SA, another field including a sequence number, which is also a part of the IPSec header may be used. In this way, the combination of the tuple in conjunction with the sequence number of the outermost IPSec header of a packet may uniquely identify the packet.

More specifically, a first packet attribute 265a identifies that the IPSec packet 105a belongs to a group (e.g., SA X) and a second packet attribute 265b indicates a sequence number (SN) which is unique to this packet 105a among all packets using "SA X." A tuple is formed of the first packet attribute 265a. The tuple indicates that the IPSec packet 105a belongs to the group, i.e., "SA X." Combining the tuple with the sequence number 265b, a unique identification of the packet may be provided. In one embodiment. the first packet attribute 265a may be provided in the outermost IP security header as illustrated in FIG. 5A. For a uniquely identified packet, such as the IPSec packet 105a, the first and second packet attributes 265a, 265b, i.e., per-packet information may be used for either the transmission or reception thereof.

Figure 6:
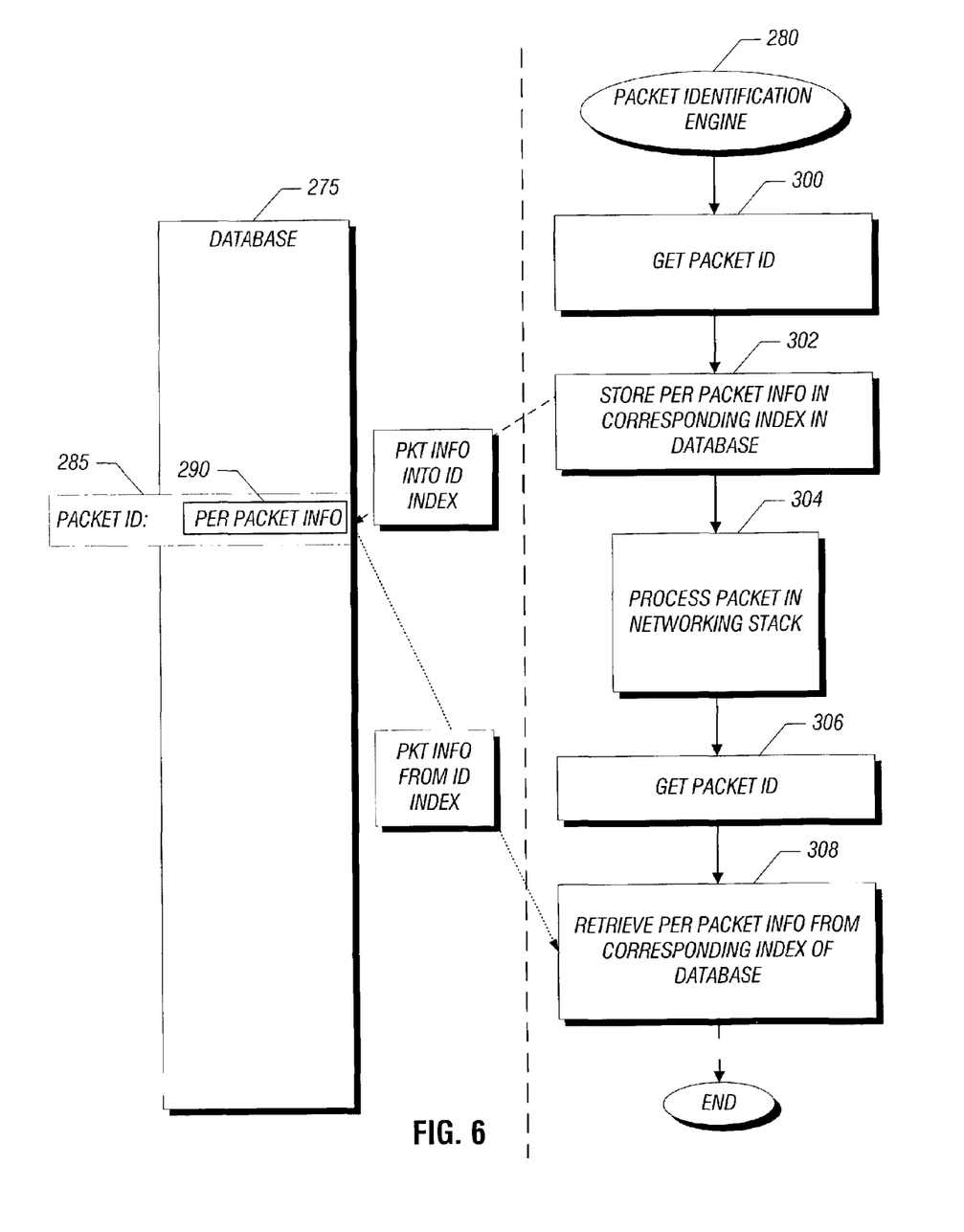
FIG. 6 is a flow chart showing an interaction of a packet identification software with a database while processing a packet of data within a network protocol stack in accordance with one embodiment of the present invention.

The parenthesized text in the description below includes an example of how IPSec offloading may be performed, in the course of a packet's transmission. To this end, an interaction between a database 275 and a packet identification engine 280 is shown in FIG. 6. Consistent with one embodiment of the present invention, the database 275 and the packet identification engine 280 may be provided at the output interface 85 located within the adapter 30. For each packet, the database 275, in one embodiment, may store per-packet information 290, which is indexed by a packet identifier (ID) 285. The packet ID 285 may enable storage and retrieval of the per-packet information 290 across layers of a networking stack.

In operation, by combining at least two packet attributes (e.g. the first and second packet attributes 265a, 265b) extracted from a packet under processing, i.e., the IPSec packet 105a, the packet identification engine 280 may acquire the packet ID 285 at block 300 as described earlier. During a certain stage of the packet's 105*a* flow in a networking stack, the IPSec packet 105*a* is observed and identified using the tuple and the sequence number derived from the first and second packet attributes 265*a*, 265*b*, as described above. (In the offloading example, this happens when the packet 105*a* is processed by an IPSec protocol handler 140 (FIG. 2) in the TCP/IP stack).

At block 302, the per-packet information 290 may be stored in the database 275 corresponding to a packet index, that is, the packet ID 285. As an example, the out-of-band information may be stored in the database 275 as a hash table using the packet ID 285 as an index. (The IPSec protocol handler 140 marks IPSec tasks to be offloaded by the acceleration device 130, and stores this information in the hash table using the packet ID 285). In this manner, using the field 260*a* a packet based on the packet template 250*a* may further be processed across layers (e.g. a first and a second layer) in a networking stack at block 304.

At a later stage of the packet's flow, the IPSec packet 105*a* is observed again and its packet ID 285 is found (e.g., this may happen when the packet 105*a* reaches the acceleration device 130).

The IPSec packet's 105*a* out-of-band information may be found in the corresponding index in the database 275, and used as necessary. At block 306, the packet ID 285 may be used to access the database 275 in the second layer after completing the processing for the first layer. For this purpose, the per-packet information 290 may be provided from the database 275 based on the packet ID 285 at block 308 in the second layer of the networking stack. (In the out-of-band data of the field 260*a*, the acceleration device 130 checks which tasks were marked earlier for offloading by the IPSec protocol handler 140. These tasks are performed in the acceleration device 130 in one embodiment of the present invention).

According to one embodiment of the present invention by temporarily overwriting a field in a packet with out-of-band data (OOB), and retrieving original data from the field when necessary, extra per-packet information between different layers or components of a network protocol stack may be provided. To reduce the interference with the regular packet flow, a convenient, e.g., relatively less used field may be selected among various fields of the packet. Such a field may be a rarely used field of the headers in the IPSec packet 105*a* in one embodiment. Although the IPSec packet 105*a* may include several IP headers, the outermost header may be used to carry the extra per-packet information in one embodiment.

Figure 5B:
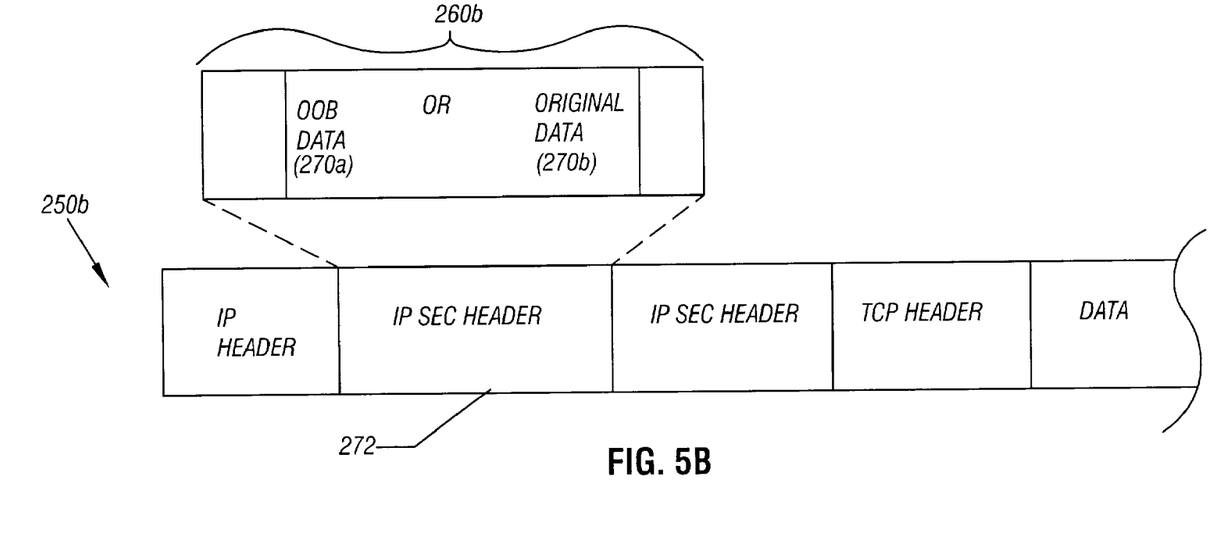
FIG. 5B shows a packet template including a field useful for out-of-band processing of a packet of data by temporarily overwriting the field in accordance with one embodiment of the present invention.

A packet template 250*b* as shown in FIG. 5B includes a field 260*b* to carry communication information, such as original data 270*b* or temporarily OOB data 270*a* for a packet, such as the IPSec packet 105*a* (FIGS. 3 and 4). The field 260*b* may be selected within an IP security header 272 for a packet based on the packet template 250*b*, in one embodiment of the present invention.

In operation, the field 260*b* in the packet template 250*b* may be overwritten with a pointer to the buffer 180 (FIGS. 3 and 4), holding the OOB data 270*a*. This pointer may be a pointer to an absolute memory area. However, this pointer may not be a pointer to an absolute memory area because whether or not a pointer points to an absolute memory area depends on the size of an absolute memory area pointer, as defined on a specific machine on which it is used. For example, in some embodiments, the field 260*b* may be overwritten by an index or a relative pointer to a specific location in a predefined database or memory area. The buffer 180 may also include the original data 270*b* that may be present in the overwritten Field 260*b*. When the original data 270*b* is desired (e.g., for doing an operation like encryption, decryption, authentication or any other operation), it may be retrieved from the buffer 180 and stored back in the corresponding field 260*b*, at least for the duration of the operation being performed. After the operation using the original data 270*b* is completed, it may be overwritten again with the pointer to the OOB data 270*a*. As described above, the field 260*b* that is selected to be overwritten may be a relatively less used field in the packet's flow (transmit or receive), so that the swapping between the original data 270*b* and the pointer to the OOB data 270*a* may be significantly reduced according to one embodiment of the present invention.

Figure 7:
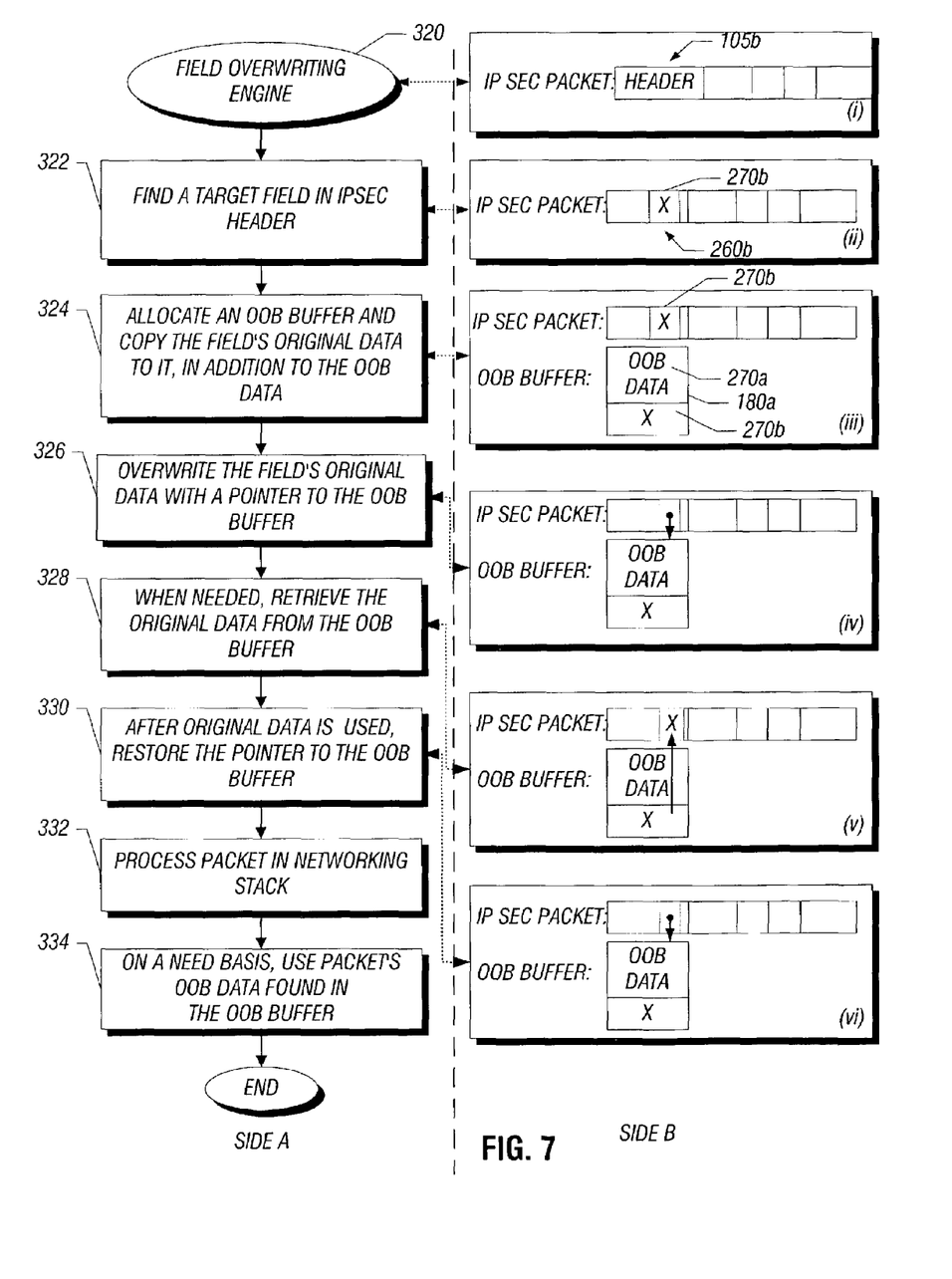
FIG. 7 is a flow chart showing an interaction of a field overwriting software with a packet of data while using a buffer in accordance with one embodiment of the present invention.

A field overwriting engine 320 as shown on "side A" in FIG. 7 may process a packet based on the packet template 250*b*, e.g., an IP security (IPSec) packet 105*b* as shown on "side B" at stage (i) in FIG. 7 according to one embodiment of the present invention. Consistent with one embodiment of the present invention, the field overwriting engine 320 may be provided at the output interface 85 located within the adapter 30. On the side A in FIG. 7, at block 322, a target field such as the field 260*b* (FIG. 5B) may be identified within an IP security header of the IP security packet 105*b* at stage (ii) based on a predefined criterion, such as a field storing relatively less used data "X." For example, in one embodiment, by checking whether the outermost IPSec header of the packet is an encapsulating security payload (ESP) header or an authentication header (AH), the ESP header's initialization vector (IV) field or the authentication data field of the AH may be identified to selectively store either the OOB data 270*a* or the original data 270*b*.

An out-of-band (OOB) buffer 180*a* may be allocated for the field 260*b* in order to first copy the field 260*b*'s original data 270*b* to another location at stage (iii) on the side B of FIG. 7. As an example, a memory buffer may be used to store the OOB data 270*a* that is desired to be added (i.e., in the OOB buffer 180*a*) and the original data 270*b* may be saved in the selected field of the OOB buffer 180*a*. (In the offloading example, the IPSec protocol handler 140 (FIG. 2) marks IPSec tasks to be offloaded by the acceleration device 130, and stores this information in the OOB buffer 180*a*). Then, the OOB data 270*a* may be copied to the OOB buffer 180*a* at block 324.

The original data 270*b* in the field 260*b* may be overwritten at stage (iv) on the side B with a pointer to the OOB buffer 180*a* corresponding to block 326 on the side A. In one case, when the IV or authentication data fields are used for OOB data 270*a*, the OOB buffer 180*a* may be found using the pointer for performing encryption/authentication. (For this purpose, the IPSec protocol handler 140 provides the IV or authentication data fields in the flow while processing the packet for the offloading example). Corresponding to block 328 of side A, the original data 270*b* may be retrieved from the OOB buffer 180*a*, if desired at stage (v) on the side B and placed back into the IPSec packet 105*b*. The original data 270*b* may be rewritten in the field 260*b*, as an example. After the original data 270*b* is used at block 330, the pointer to the OOB buffer 180*a* may be restored at stage (vi) on the side B of FIG. 7. That is, after the original data 270*b* is used, it may be overwritten again with the pointer to the OOB buffer 180*a*.

The packet may be further processed in the networking stack at block 332. When the OOB data 270*a* is to be used again for the packet 105*b*, it may be accessed from the OOB buffer 180*a* at block 334. At a later stage of the packet's flow, the OOB data 270*a* is retrieved using the pointer to the OOB buffer 180*a*. (When the packet reaches the acceleration device 130, the device driver 110 checks which tasks were marked earlier for offloading by the IPSec protocol handler 140, in the OOB buffer 180a. The device driver 110 performs these tasks in the acceleration device 130).

In some embodiments of the present invention, such an out-of-band mechanism may be built in an operating system (OS). The out-of-band mechanism may also be used in an OS that does not supply such a built-in mechanism or in cases where using a built-in-mechanism is not wanted or more complicated. One feature of one embodiment of the present invention is its flexibility, providing a simple interface that allows IPSec software implementations to easily use IPSec acceleration devices with minimal modifications to existing code. The offloading module 174 (FIG. 4) may handle all the operations concerning which tasks will be offloaded by which device, and which tasks will not be offloaded. Moreover, the offloading module 174 supplies all the information needed to do the offloading itself. In this way, advantageously a network data processing system may be designed not specifically limited to a certain environment (e.g., a certain operating system (OS), a certain security engine, or a certain hardware acceleration device). In addition, in one network architecture consistent with an embodiment of the present invention both inline and asynchronous offloading may be supported.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
registering a capability of a first device;
receiving a packet of data including a task to be handled;
determining whether to assign the task to the first device based on the capability;
providing at least two modules in the first device, said each module including a task handling capability;
selecting one module over the other module to assign the task based on the task handling capability associated with each module;
performing inline cryptographic operations in the one of said at least two modules; and
performing asynchronous cryptographic operations in the other module of said at least two modules.

2. The method of claim 1 including:
providing an indication in said packet to assist in distribution of the task; and
comparing the indication with the capability to selectively offload the task to said first device based on the comparison.

3. The method of claim 2 including:
populating a field in the packet to carry communication information including at least two packet attributes; and
enabling a flow for the packet across a stack of a first and a second layers of a network protocol based on said communication information.

4. The method of claim 3 including:
selecting in the packet said field that holds a relatively less used data based on a predetermined criterion; and
associating a buffer with said field to hold said communication information.

5. The method of claim 4 including:
transferring from said field the relatively less used data to said buffer,
providing in said field data to enable at least one of intra-layer communications and intra-component communications for a networking stack; and
selectively retrieving from the buffer the relatively less used data.

6. The method of claim 3 including:
extracting said at least two packet attributes from said communication information when communicating the packet to the first layer of the network protocol;
combining said at least two packet attributes to form a unique packet identifying indication;
using said unique packet identifying indication to store said at least two packet attributes in a database; and
using said unique packet identifying indication to retrieve said at least two packet attributes from the database to identify the packet for the second layer of the network protocol.

7. A processor-based system comprising:
a first device including a first capability to perform inline cryptographic tasks;
a second device including a second capability to perform asynchronous cryptographic tasks; and
a storage device storing a program and a module, said storage device operably coupled to said first and second devices wherein said program to receive a packet of data including a task to be handled for said program, and said module to interface with said program and said first and second devices to determine whether to assign the task to said first device over said second device based on the first and second capabilities.

8. The processor-based system of claim 7, wherein the task to be derived from a field of the packet of data, said field comprising data to enable a flow for the packet of data across a stack of a first and a second layers of a network protocol.

* * * * *